(12) United States Patent
Horst

(10) Patent No.: US 9,262,653 B2
(45) Date of Patent: Feb. 16, 2016

(54) READER FOR DATA INTERCHANGE WITH A MOBILE DATA MEMORY

(71) Applicant: Siemens Aktiengesellschaft, Munich (DE)

(72) Inventor: Dieter Horst, Cadolzburg (DE)

(73) Assignee: Siemens Aktiengesellschaft, Munich (DE)

( * ) Notice: Subject to any disclaimer, the term of this patent is extended or adjusted under 35 U.S.C. 154(b) by 347 days.

(21) Appl. No.: 13/850,780

(22) Filed: Mar. 26, 2013

(65) Prior Publication Data
US 2013/0257597 A1 Oct. 3, 2013

(30) Foreign Application Priority Data
Mar. 29, 2012 (EP) .................................... 12162049

(51) Int. Cl.
| | |
|---|---|
| H04Q 5/22 | (2006.01) |
| G06K 7/10 | (2006.01) |
| G06K 7/00 | (2006.01) |
| H04B 1/30 | (2006.01) |

(52) U.S. Cl.
CPC .......... G06K 7/10009 (2013.01); G06K 7/0008 (2013.01); G06K 7/10198 (2013.01); G06K 7/10465 (2013.01); H04B 1/30 (2013.01)

(58) Field of Classification Search
USPC ...................................................... 340/572.4
See application file for complete search history.

(56) References Cited

U.S. PATENT DOCUMENTS

| | | | |
|---|---|---|---|
| 6,122,329 A | 9/2000 | Zai et al. | |
| 8,207,826 B2 | 6/2012 | Crooks et al. | |
| 8,335,287 B2 | 12/2012 | Fukuda et al. | |
| 2001/0004379 A1* | 6/2001 | Wilson | 375/148 |
| 2006/0097850 A1 | 5/2006 | Stobbe et al. | |
| 2006/0186995 A1* | 8/2006 | Wu et al. | 340/10.1 |
| 2007/0057057 A1* | 3/2007 | Andresky et al. | 235/451 |
| 2008/0088416 A1* | 4/2008 | Crooks et al. | 340/10.41 |
| 2009/0144090 A1* | 6/2009 | Abri | 705/3 |
| 2010/0128773 A1 | 5/2010 | Fukuda et al. | |
| 2010/0277289 A1 | 11/2010 | Brauner et al. | |

FOREIGN PATENT DOCUMENTS

| | | |
|---|---|---|
| CN | 101162505 A | 4/2008 |
| CN | 101739577 A | 6/2010 |
| EP | 1 655 684 | 5/2006 |
| WO | WO 00/63830 | 10/2000 |
| WO | WO 2008/092283 | 8/2008 |

\* cited by examiner

*Primary Examiner* — Brian Zimmerman
*Assistant Examiner* — Thomas McCormack
(74) *Attorney, Agent, or Firm* — Cozen O'Connor

(57) ABSTRACT

A reader for data interchange with a mobile data memory, i.e., a ultra-high frequency (UHF) RFID transponder, wherein the reader includes reception electronics for converting a high frequency signal received via an antenna into a low frequency signal and includes a decoding device for converting the low frequency signal into data. The reader also includes an analog-digital converter for digitizing and a memory device, linked thereto, for storing the low frequency signal from at least one period of time from a communication event, and also includes an analysis device for evaluating a low frequency signal stored in this manner so that it is possible to independently analyze the processed low frequency signal whenever a mobile data memory is misread (spuriously sensed), wherein the analog-digital converter which is used in the readers can advantageously also be used for digitizing the low frequency signal stored for the analysis purposes.

17 Claims, 1 Drawing Sheet

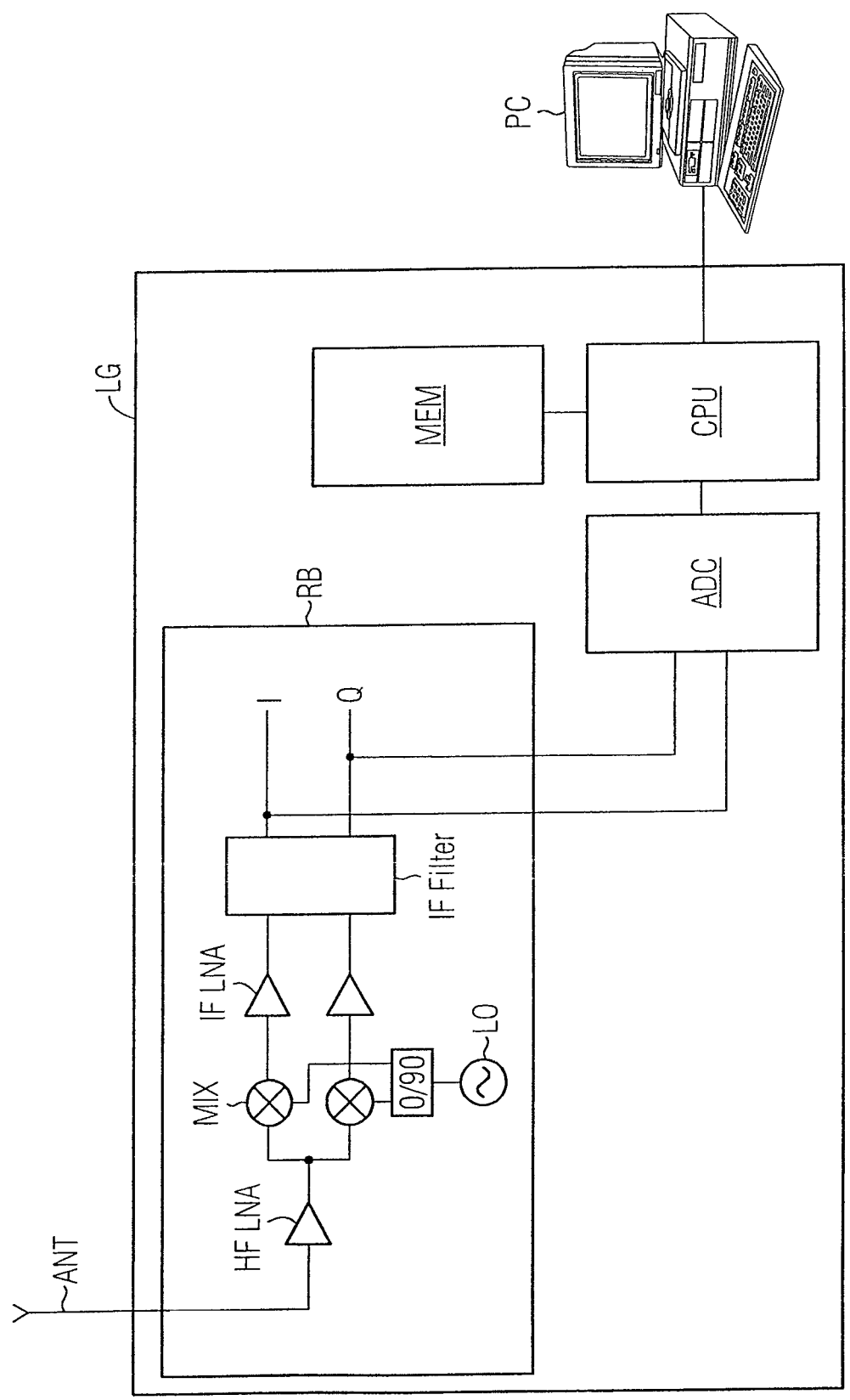

READER FOR DATA INTERCHANGE WITH A MOBILE DATA MEMORY

BACKGROUND OF THE INVENTION

1. Field of the Invention

The invention relates to a reader for data interchange with a mobile data memory.

2. Description of the Related Art

In industrial applications, but also in other areas, goods and capital goods are identified by using mobile data memories which are sensed and read wirelessly by an electromagnetic field. This relates particularly to Ultra High Frequency (UHF) RFID transponders, which are in widespread use for the cited purposes. Particularly in industry (production) and in automotive construction, much higher reading rates are required in comparison with other fields of use, for example, materials management, retail and logistics, where the reading rate gives the proportion of successful access operations on the data memories. This is typically approximately 99.98% in the processing industry and in automotive construction.

Precisely in the industrial environment, in which the particularly good reading rates are required, data interchange with the data memories (transponders) is frequently made more difficult by external conditions, for example, the presence of metallic, reflective surfaces or electromagnetic interference, movements by the articles denoted by the data memories. So as nevertheless to be able to achieve the high reading rates that are required, it is absolutely essential to be able to perform precise analysis in the event of faults. Only in this way is it possible to identify and remedy causes of the faults.

Usually, relatively frequent faults, i.e., read errors, involve the use of measurement receivers in proximity to the reader used, where the measurement receivers are used to record and later evaluate the data interchange between a reader and the sensed data memories (transponders). This means that all the activity on the "air interface" of the radio channels used is recorded ("logged"), after which the recorded profile of the high frequency signal or intermediate frequency signal is immediately ("online") or later ("offline") searched for a cause of the fault, such as interference frequencies, field attenuations, protocol errors or signal overlaps (overlap, echoes).

To date, the measurement receivers used for error analysis are what are known as "RealTime Spectrum Analyser" (RSA). To this end, a measurement antenna that is used to supply the high frequency signals to the RSA is placed directly next to the reading position, i.e., the site of the productively used reader or the antenna thereof. The signal is continuously recorded and stored. In the event of an error, the recording is stopped (manually or automatically by a controller to which the reader is connected), and the error is analyzed.

This approach to fault analysis has disadvantages, however. By way of example, it is very sophisticated to obtain and place a specific measurement receiver following identification of an increased error rate, where the antenna of the measurement receiver needs to be arranged as close as possible beside the antenna of the productively used reader. Besides the sophistication associated therewith, it must be expected that the antenna of the measurement receiver in turn influences the measured electromagnetic field, which means that the presence of the antenna of the measurement receiver corrupts the measurement result. Furthermore, although the measurement receiver can be used to comprehend what is happening "on the air interface", it can only indirectly explain which signal has actually been received and processed by the productive reader. Furthermore, it is difficult in the case of such an analysis for individual erroneous read operations to be associated with particular sections of the material recorded for analysis purposes, this generally requiring precise synchronization between the measurement receiver and the productive reader. A further disadvantage is that the method described, i.e., the use of a specific measurement receiver in such arrangements as have a greater than average number of errors, cannot be used at all to analyze the errors that occurred originally, but instead it must be relied upon that the errors occur again with the same cause as soon as the measurement receiver is used.

SUMMARY OF THE INVENTION

It is thus an object of the present invention to provide a simple, inexpensive and reliable method of error analysis during data interchange between a reader and a mobile data memory.

This and other objects and advantages are achieved in accordance with the invention by equipping the reader itself with the necessary device for analyzing the radio-based data interchange, where with the device it is firstly possible to analyze even the first error to have occurred, and secondly the productive scenario is not influenced by the presence of an additional measurement receiver or the antenna thereof, and thus the device which is present in a reader anyway, for example, the antenna, high frequency circuit portion and microprocessor, can also be used for the necessary analysis. Finally, the integration of the analysis device in a reader allows access to precisely those high frequency signals and intermediate frequency signals that are also being supplied or have been supplied to the decoder of the productive reader. The replacement of the customary "external analysis" with the "internal analysis" thus firstly results in a time and cost saving, because analysis appliances do not need to be obtained and installed. Similarly, a higher quality of analysis is thus obtained, because precisely that signal which has also been processed by the reader itself is analyzed, and furthermore there is the possibility of (subsequent) analysis for every error, because the reader modified in this manner is constantly able to store the relevant signal components.

In accordance with the invention, the reader is configured for data interchange with a mobile data memory, particularly with a UHF RFID transponder, where the reader has reception electronics for converting a high frequency signal, received via an antenna, into a low frequency signal and has a decoding device for converting the low frequency signal into data. In this case, the reader has an analog-digital converter for digitizing and a memory device, linked thereto, for storing the low frequency signal from at least one period of time from a communication event (e.g. a read or write cycle), and where the reader has an analysis device for evaluating a low frequency signal stored in this manner. A modified reader of this kind can independently analyze the processed low frequency signal whenever a mobile data memory is misread (spuriously sensed), where the analog-digital converter that is used in the readers anyway can advantageously also be used for digitizing the low frequency signal stored for the analysis purposes.

Advantageously, the low frequency signal connected to at least one input of the analog-digital converter is the high frequency signal that has been mixed with an intermediate frequency and subsequently filtered, this having the advantage that the intermediate frequency signal or low frequency signal that is already present in a customary reader anyway can be "sampled" for storage. A separate mixing stage is thus not required. With particular advantage, the low frequency signal stored and processed in this case is a quadrature signal, which is usually required anyway, where the memory device is advantageously configured to store both quadrature components separately, and where the analysis device is configured to analyze both components of the digitized and stored quadrature signal.

In one advantageous embodiment, the memory device or the memory used for storing the signal provided for the analysis is organized as a ring memory, where the reader is then set up such that the digitized low frequency signal is stored continually until evaluation of the stored low frequency signal is decreed or begun. This has the advantage that only a limited amount of memory needs to be reserved for analysis purposes, where the memory is able to be recurrently overwritten if there is no event. In one particularly advantageous embodiment of the invention, a further memory or a second ring memory area can be provided for longer-term storage of the analysis data, so that in cases in which analysis of a stored signal section has not concluded, it is still possible for the storage of the digitized low frequency signal to be continued "in the background". It is thus also possible to permanently store the relevant signal section, and to supply it to subsequent, possibly external, analysis, for such errors as cannot be analyzed satisfactorily by the reader itself. By way of example, it is thus also possible for the second memory area used to be a—possibly external—mass memory which does not need to meet the same speed requirements as the ring memory area, which needs to be filled in "real time". By way of example, this external memory may also be in the form of a USB memory, in the form of a hard disk or in the form of a network memory. In that case, following transmission of the relevant digitized signal section to this external memory, the "internal" memory area (ring memory) is available again for sensing subsequent communication events.

Advantageously, a trigger apparatus is provided to start the evaluation, where it is possible to prescribe at least one, but advantageously also a plurality of, selectable trigger conditions for the trigger apparatus. Besides the "triggering" for erroneous read operations (access operations), it is also possible to store and analyze positive examples of communication events for comparison purposes. Provided that a trigger condition is directed at the detection of an error, it is advantageously possible for different trigger conditions to be provided for different types of errors, where it is also possible to provide different analysis methods for evaluating the stored low frequency signal depending on the trigger condition and hence depending on the type of event which has initiated an analysis. This means that when erroneous received data (e.g., checksum errors) are detected, for example, a different signal section is examined than in cases in which, by way of example, communication has not taken place on account of an erroneous "preamble" in a communication cycle. Advantageously, the trigger apparatus is in this case set up to analyze the decoded low frequency signal, where evaluation is provided in those cases in which the data have a property that corresponds to a trigger condition.

Advantageously, the analysis device is set up for spectral analysis and for evaluation of at least one spectral component of the recorded low frequency signal. Such spectral analysis, which can be performed by fast Fourier transformation, for example, allows interference by other high frequency signals to be identified particularly advantageously.

Advantageously, the reader has an interface for accessing a result of the evaluation and additionally advantageously also for accessing the stored raw data, i.e., the stored low frequency signal. Such an interface may advantageously be in the form of a web interface for access by a web browser of an external appliance.

In one particularly advantageous embodiment, the analysis device may be in a form such that the result of the analysis is used to customize at least one operating parameter of the reader, such as in the high frequency portion thereof.

A particularly economical implementation of the reader according to the disclosed embodiments of the invention is obtained if a microprocessor which is present in the reader anyway and which is responsible for decoding the low frequency signal during productive operation is also used for evaluating the stored low frequency signals. The same applies to any analog-digital converter which is already present, the output signal from which, i.e., the digital data, is both supplied to the customary decoding and recorded for later analysis in the memory device. Advantageously, the evaluation is then performed only following completion of the communication event, which means that the microprocessor of the reader does not need to spare any computation time or processing cycles for the analysis during the communication event, and on the other hand what are known as "idle times" between individual communication events can be used for processing the stored data.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the reader according to the invention is explained below with reference to the drawing.

In the drawing, the single FIGURE schematically shows a reader having an antenna and a connected external appliance (Personal Computer).

DETAILED DESCRIPTION OF THE PREFERRED EMBODIMENTS

The FIGURE shows, in excerpt form and schematically as a block diagram, a reader LG for data interchange with a mobile data memory (not shown), such as a UHF RFID tag. The reader LG is connected to a personal computer PC and to an antenna ANT; the antenna may naturally also be an integral part of the reader LG. Instead of or in addition to the personal computer PC shown, the reader LG may also be connected to an industrial controller programmable logic controller (PLC), with the reader LG in one advantageous embodiment being connected to a data network (e.g., Ethernet, Profinet or the like), which means that simultaneous data interchange with a multiplicity of other components is also possible.

The reader LG comprises a reception module RB ("Receiver Block"), with embodiments also being possible in which a combined transmission and reception module, i.e., a "high frequency module", is used. In the reception module RB, the high frequency signal from the antenna ANT is supplied to an input amplifier High-Frequency Low-Noise Amplifier (HF LNA), after which the signal amplified in this manner is supplied to a mixing stage MIX, where it is mixed with the intermediate frequency of an oscillator LO ("Local Oscillator") and with the phase-shifted signal from the same oscillator LO. The two resultant signal components are respectively amplified by an amplifier stage IF LNA ("Intermediate-Frequency Low-Noise Amplifier") and supplied to an intermediate frequency filter IF Filter ("Inter-Frequency Filter"). The two resultant signal components I, Q together form a low frequency signal, which is then decoded in a known an arrangement, where the useful data is recovered from the received signal. For decoding purposes, the signal is supplied to an analog-digital converter ADC, after which the low frequency signal digitized in this manner is decoded. For decoding purposes, it is possible to use a module having stipulated logic, for example, an ASIC; in the present exemplary embodiment, a microprocessor CPU is used for this.

The low frequency signal, which is also called the "down-converted baseband signal", is processed separately in the present exemplary embodiment as a two-component quadrature signal; in an alternative embodiment, it is also possible to process a different representation of the (mixed and filtered) baseband signal, for example, separated according to absolute value and phase angle, which subsequently, i.e., after the analog-digital conversion, also results in a different numerical representation. In the case of (an) AD converter(s) and memories of appropriate speed, it is also possible to store and evaluate a higher frequency signal than the one under consideration here, particularly in the case of receivers having a plurality of mixing stages and intermediate frequencies; simultaneous storage of the signals from different processing stages is also possible given appropriate equipment.

According to disclosed embodiments of the invention, the low frequency signal I, Q (the down-converted baseband signal) is stored continually in a memory area following the analog-digital conversion, where the memory area is organized as a ring memory (also called a ring buffer). The size of this ring memory is ideally at least large enough for at least one communication event, i.e., a read or write cycle, to be able to be recorded. In this case, the microprocessor CPU responsible for organizing the storage, and the opportunity for accessing the memory MEM which comprises the memory area, need to be configured such that the storage can occur sufficiently quickly and also independently of the actual read/write order of the reader LG.

The microprocessor CPU or the software thereof (not shown in the block diagram) is used to implement triggering which, based on states or events detected, stops the recording of the ring memory and then initiates evaluation of the stored time profile of the low frequency signal. Ideally, different error states or non-error states can be configured as a trigger event. In one advantageous embodiment, it is possible to configure individual or all trigger events such that the content of the ring memory area, i.e., the memory MEM or of the part of the memory MEM which is used as a ring memory, which is present when the event occurs is saved. This means that the relevant memory content is either protected against further overwriting or is copied to another memory for later evaluation, this other memory also being able to be an external memory in the form of a network memory, an external hard disk or the like. It is also possible to define a plurality of ring memory areas which are filled successively and independently of one another, it also being possible to assign different ring memory areas to individual or multiple error types or trigger events.

Following the conclusion of the communication event to be examined, i.e., ideally when the microprocessor CPU with its almost complete processing capacity is no longer required for regular operation of the reader LG, the stored data are conditioned, such as for later visual display. To this end, the reader LG has an appropriate software module which can perform this task, where the software module comprises, by way of example, methods for spectral analysis (e.g., fast Fourier transformation), statistical evaluations, signal strength and signal quality evaluations, etc. For the purpose of visual display of the data, a web browser of the connected personal computer PC can be used, for example, in which case the reader LG should accordingly have an integrated web server. The reader LG is advantageously also able to transfer the possibly already examined "raw data" ("Air Interface Shot"), i.e., the stored low frequency signal, to an external appliance, such as the personal computer PC, for additional or alternative external evaluation.

In a further advantageous embodiment of the invention, the result of the analysis may also be instructions which relate to alteration of parameters of the reader LG itself. By way of example, this may concern alteration of the operating parameters of the integrated amplifiers HF LNA, IF LNA, matching of the frequency of the local oscillator LO, a change in the tuning or orientation of the antenna ANT or the like.

Ideally, the hardware of the reader LG according to the invention differs from a reader from the prior art essentially only by virtue of the provision of a memory MEM of sufficient size, which should be capable of holding the additional data, i.e., the low frequency signal recorded in the ring memory area, and the software for evaluating this recorded low frequency signal, in addition to the actual operating software (firmware) of the customary reader LG.

In one advantageous embodiment, the reader LG has additional display means, for example, in the form of signal lamps or an alphanumeric display, these being able to be used to output errors and error types (error codes, plain text) which are detected. In a further, alternative embodiment, the reader LG may also be equipped with an additional interface, for example, a USB interface, and in cases in which the reader LG is meant to analyze the data interchange via the air interface a storage medium (USB stick or the like) is coupled to said external interface, with the reader LG then recording the results of its analyses and/or the "raw data" on this storage medium.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A reader for data interchange with a mobile data memory, comprising:
   reception electronics for converting a high frequency signal received via an antenna into a low frequency signal;
   a decoding device for converting the low frequency signal into data;
   an analog-digital converter for digitizing signals;

a memory device linked to the analog-digital converter for storing the low frequency signal from at least one period of time from a communication event;

an analysis device for evaluating the low frequency signal from the at least one period of time from a communication event stored in the memory device; and a microprocessor which decodes and evaluates the stored low frequency signal, said microprocessor implementing triggering which, based on detected states or detected communication events, stops the memory device from recording and then initiates evaluation of a time profile of the stored low frequency signal.

2. The reader as claimed in claim 1, wherein the low frequency signal connected to at least one input of the analog-digital converter is a high frequency signal which has been mixed with an intermediate frequency and subsequently filtered.

3. The reader as claimed in claim 1, wherein the low frequency signal is a quadrature signal; wherein the memory device is configured to store both components of the quadrature signal separately; and wherein the analysis device is configured to analyze both components of a digitized and stored quadrature signal.

4. The reader as claimed in claim 2, wherein the low frequency signal is a quadrature signal; wherein the memory device is configured to store both components of the quadrature signal separately; and wherein the analysis device is configured to analyze both components of a digitized and stored quadrature signal.

5. The reader as claimed in claim 1, wherein the memory device includes a memory organized as a ring memory; wherein the reader is configured such that the digitized low frequency signal is stored continually until evaluation of the stored low frequency signal is begun.

6. The reader as claimed in claim 5, further comprising: a trigger apparatus for starting the evaluation.

7. The reader as claimed in claim 6, wherein at least one trigger condition is prescribable for the trigger apparatus.

8. The reader as claimed in claim 7, wherein a plurality of trigger conditions are prescribable; wherein two different analysis methods for evaluating the stored low frequency signal are provided for the analysis device for at least two different trigger conditions.

9. The reader as claimed in claim 6, wherein the trigger apparatus is configured to analyze a decoded low frequency signal; and wherein the evaluation is provided in those cases in which data have a property which corresponds to a trigger condition.

10. The reader as claimed in claim 1, further comprising:
at least one further memory device;
wherein the at least one further memory device is useable to store a period of time from the low frequency signal for subsequent evaluation.

11. The reader as claimed in claim 1, wherein the analysis device is configured for spectral analysis and for evaluation of at least one spectral component of the recorded low frequency signal.

12. The reader as claimed in claim 1, further comprising:
an interface for accessing a result of the evaluation.

13. The reader as claimed in patent claim 12, wherein the interface is useable to retrieve the stored low frequency signal.

14. The reader as claimed in claim 13, wherein the interface is formed as a web interface for access by a web browser of an appliance that is connected to the reader by a communication link.

15. The reader as claimed in claim 1, wherein the analysis device is configured to change at least one operating parameter of the reader using a result of the evaluation.

16. The reader as claimed in patent claim 1, wherein the evaluation is performed following completion of the communication event.

17. The reader as claimed in claim 1, wherein the mobile data memory is an ultra-high frequency RFID transponder.

\* \* \* \* \*